US010737708B2

(12) United States Patent
Becke et al.

(10) Patent No.: US 10,737,708 B2
(45) Date of Patent: Aug. 11, 2020

(54) METHOD AND DEVICE FOR VEHICLES, WHICH DETECT THE COLLISION OF A FURTHER VEHICLE

(71) Applicant: SIEMENS MOBILITY GMBH, Munich (DE)

(72) Inventors: Lothar Becke, Koenigslutter (DE); Karsten Rahn, Cremlingen (DE); Luis Riera Sanchez, Alcala de Henares (ES); Frauke Schossig, Braunschweig (DE); Rene Wettig, Wolfenbuettel / Ahlum (DE)

(73) Assignee: Siemens Mobility GmbH, Munich (DE)

( * ) Notice: Subject to any disclaimer, the term of this patent is extended or adjusted under 35 U.S.C. 154(b) by 21 days.

(21) Appl. No.: 15/562,045

(22) PCT Filed: Mar. 24, 2016

(86) PCT No.: PCT/EP2016/056577
§ 371 (c)(1),
(2) Date: Sep. 27, 2017

(87) PCT Pub. No.: WO2016/156215
PCT Pub. Date: Oct. 6, 2016

(65) Prior Publication Data

US 2018/0105190 A1 Apr. 19, 2018

(30) Foreign Application Priority Data

Mar. 27, 2015 (DE) ........................ 10 2015 205 608

(51) Int. Cl.
*B61H 13/00* (2006.01)
*B61L 23/34* (2006.01)
(Continued)

(52) U.S. Cl.
CPC .............. *B61H 13/00* (2013.01); *B61L 23/34* (2013.01); *B61L 25/02* (2013.01); *G08G 1/162* (2013.01); *G08G 1/166* (2013.01)

(58) Field of Classification Search
None
See application file for complete search history.

(56) References Cited

U.S. PATENT DOCUMENTS 5,192,903 A * 3/1993 Kita ........................ B61L 23/34 180/167
5,394,137 A * 2/1995 Orschek ................ B60T 17/221 188/1.11 E (Continued)

FOREIGN PATENT DOCUMENTS

CN 2213091 A 11/1995
CN 2404773 Y 11/2000

(Continued)

*Primary Examiner* — Tamara L Weber
(74) *Attorney, Agent, or Firm* — Laurence Greenberg; Werner Stemer; Ralph Locher

(57) ABSTRACT

A method for operating vehicles, in particular track-bound vehicles, permits two vehicles to approach one another even to comparatively short distances and at the same time can be implemented with comparatively low expenditure. For this purpose, a collision by a first vehicle towards the rear of a second vehicle is detected by the second vehicle, a warning message is emitted by the second vehicle triggered by the detection of the collision or running into from the rear, and a braking process is triggered by the first vehicle on the basis of the warning message emitted by the second vehicle. A device for a vehicle which detects the collision of a further vehicle is also provided.

16 Claims, 1 Drawing Sheet

(51) Int. Cl.
*B61L 25/02* (2006.01)
*G08G 1/16* (2006.01)

(56) References Cited

U.S. PATENT DOCUMENTS

| | | | | |
|---|---|---|---|---|
| 5,758,848 | A | 6/1998 | Beule | |
| 7,027,899 | B2 | 4/2006 | Mindel | |
| 7,206,676 | B2 | 4/2007 | Cross et al. | |
| 8,200,381 | B2 | 6/2012 | Carroll | |
| 9,043,131 | B2 * | 5/2015 | Carlson | B61L 15/0027 340/436 |
| 2003/0182030 | A1 | 9/2003 | Kraeling et al. | |
| 2009/0204289 | A1 | 8/2009 | Lehre et al. | |
| 2011/0108677 | A1 * | 5/2011 | Asuka | B61L 23/14 246/27 |
| 2014/0012439 | A1 * | 1/2014 | Dimmer | B61L 25/025 701/19 |
| 2015/0100285 | A1 * | 4/2015 | Heidinger | G06F 17/5009 703/2 |
| 2016/0096537 | A1 * | 4/2016 | Bartek | B61L 15/0027 246/124 |

FOREIGN PATENT DOCUMENTS

| | | | |
|---|---|---|---|
| CN | 101273280 | A | 9/2008 |
| DE | 4302377 | A1 | 8/1994 |
| DE | 19509696 | A1 | 9/1996 |
| DE | 19822803 | A1 | 11/1999 |
| DE | 10034723 | A1 | 2/2002 |
| DE | 60300520 | T2 | 2/2006 |
| DE | 102010027952 | A1 | 12/2011 |
| DE | 102011085002 | A1 | 4/2013 |
| EP | 1391365 | A1 | 8/2002 |
| EP | 2420426 | A2 | 2/2012 |

* cited by examiner

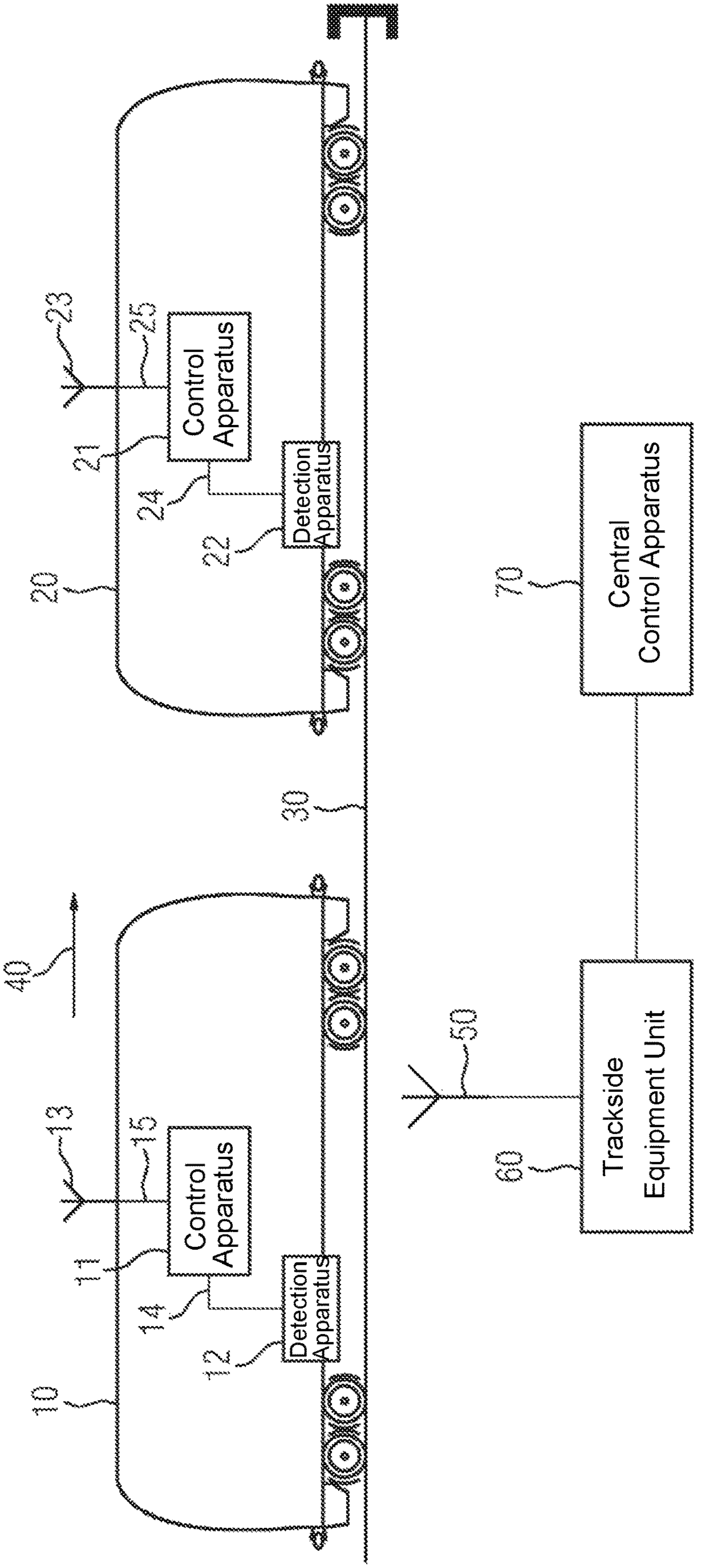
10
11
12
13
14
15
Control Apparatus
Detection Apparatus
20
21
22
23
24
25
Control Apparatus
Detection Apparatus
30
40
50
60
Trackside Equipment Unit
70
Central Control Apparatus

METHOD AND DEVICE FOR VEHICLES, WHICH DETECT THE COLLISION OF A FURTHER VEHICLE

BACKGROUND OF THE INVENTION

Field of the Invention

In particular in the case of railborne vehicles, which may for example involve track-mounted vehicles, rail-guided vehicles with rubber tires or magnetic levitation vehicles, the requirement exists that two vehicles should be able to approach to within a comparatively short distance of each other, including while in automatic, under certain circumstances driverless operation in special situations. This relates on the one hand in particular to the case that one of the vehicles is to be brought as close as possible to an already parked further vehicle in a depot or on a sidetrack. On the other hand the necessity also exists for two vehicles to travel towards each other to within a very short distance in the case of coupling procedures. Particularly with the use of automatic train control systems, perhaps in the form of a CBTC (Communication-Based Train Control) system or an autonomous vehicle of another kind, the problem here exists that an approach of the vehicles can be required or desirable to a distance which is smaller than the positioning inaccuracies associated with the approaching vehicle. This has the result that in practice in particular automatic, under certain circumstances driverless operation avoiding damage to the vehicles or operational disruptions is difficult to effect in the previously cited special situations.

SUMMARY OF THE INVENTION

The present invention is based on the task of specifying a method for the operation of vehicles, in particular of railborne vehicles, which permits the approach of two vehicles to within short distances and can be realized with comparatively little outlay.

According to the invention this problem is solved by means of a method for the operation of vehicles, in particular of railborne vehicles, wherein the collision of a first vehicle with a second vehicle is detected on the part of the second vehicle, a warning message triggered by the detection of the collision is transmitted from the second vehicle, and a braking procedure is initiated on the part of the first vehicle on the basis of the warning message transmitted from the second vehicle.

According to the first method step, the inventive method for the operation of vehicles, in particular of railborne vehicles, is characterized in that the collision of a first vehicle with a second vehicle is detected on the part of the second vehicle. This means that although a corresponding collision procedure is not necessarily the objective, it is permissible or acceptable for detection of the collision of the first vehicle with the second vehicle to take place. It should here be borne in mind that the corresponding detection is not effected by the colliding first vehicle itself, but by the second vehicle, towards which the first vehicle is traveling. Within the framework of the inventive method, the detection of the collision of the first vehicle by the second vehicle can take place in any manner known per se. Thus, for example an in-vehicle hodometer or odometer, possibly in the form of a distance pulse generator, an acceleration sensor, a shock sensor or vibration detector or also a radar sensor can be used here.

According to the second step of the inventive method a warning message is then transmitted from the second vehicle, triggered by the detection of the collision. The transmission of the warning message can here take place in any manner known per se. This includes in particular a radio-based transmission of the warning message. As an alternative to this, a corresponding warning message can however also for example be transmitted optically or in the case of vehicles in the form of rail vehicles, also using the tracks as the transmission medium.

According to the third step of the inventive method a braking procedure is initiated on the part of the first vehicle as a consequence of the warning message transmitted from the second vehicle. Damage to the two vehicles and an undesired change in position of the second vehicle in particular should hereby be prevented.

The inventive method thus departs from the customary perception that the collision of a first vehicle with a second vehicle can and must be prevented at all times and in all operational situations that occur. Building on this basis, the inventive method makes it possible, in the event that the first vehicle is traveling towards the second vehicle, to guarantee in a reliable and robust manner that the first vehicle brakes. This takes place advantageously in that a warning message is transmitted from the second vehicle, triggered by the detection of the collision, as a consequence of which a braking procedure is initiated on the part of the first vehicle. It is here basically conceivable that the first vehicle too itself has means to ascertain the collision towards the second vehicle and thereupon to initiate a braking procedure. In this case a redundancy is created as a result of the second vehicle transmitting a corresponding warning message, by means of which the overall robustness and operational safety is increased. As an alternative to this it is however possible that the collision of the first vehicle with the second vehicle is detected exclusively by the second vehicle. This is in particular favorable in the respect that in this case the first vehicle itself need not possess any means of detecting the collision with the second vehicle. This is in particular advantageous in such situations, in which according to the circumstances it is simpler for the second vehicle reliably to detect the collision of the first vehicle with the second vehicle.

It should here be pointed out that within the framework of the present invention both the first vehicle and the second vehicle can consist of any number of powered and/or unpowered units, fixedly or loosely connected, linked or coupled to each other.

According to a particularly preferred development of the inventive method, in the case that the second vehicle is stationary, the collision of the first vehicle with the is stationary second vehicle is detected on the part of the second vehicle based on standstill monitoring. This is advantageous, as in particular in the case of the approach of the first vehicle to a stationary second vehicle, as a rule it is simpler for the latter to detect the collision of the first vehicle with the second vehicle in a reliable and rapid manner. It should be borne in mind here that in particular vehicles in the form of rail vehicles often already have a corresponding standstill monitor, which in many cases is also then active if the vehicle concerned is parked or out of service. Within the framework of the inventive method the corresponding standstill monitor can now advantageously be used to detect the collision of the first vehicle with the second vehicle. This in particular offers the advantage that neither on the part of the first vehicle nor on the part of the second vehicle are extra components required for the detection of a corresponding collision procedure.

The inventive method can also advantageously be embodied in such a way that the warning message transmitted from the second vehicle is received directly by the first vehicle. In this case, the warning message is thus received by the first vehicle without the interpositioning of further, in particular trackside components. To this end, the transmission of the warning message can be effected by the second vehicle for example in the form of a “broadcast” message, which thus does not specify the first vehicle expressly as the recipient. This offers the advantage that it need not necessarily be known to the second vehicle which first vehicle is traveling towards the second vehicle and how this first vehicle can be addressed from the communication technology perspective. Particularly in the is case of railborne vehicles and automatic operation with the use of a CBTC system, transmission of the warning message here preferably takes place with the aid of radio, for example using a WLAN (Wireless Local Area Network), possibly in accordance with the IEEE 802.11 Standard.

As an alternative to the previously described embodiment, the inventive method can also advantageously be developed in such a way that the warning message transmitted from the second vehicle is received by the first vehicle with the interpositioning of trackside equipment. This embodiment of the inventive method is in particular advantageous to the effect that the second vehicle in many cases will already anyway be connected with trackside equipment, possibly in the form of a trackside unit of a train control system, from the communications technology perspective. In this case the corresponding trackside equipment can thus be used to receive the warning message transmitted from the second vehicle and to forward it to the first vehicle in unchanged or changed form. In this case use is thus advantageously made of such communication channels that are anyway already present for the transmission of the warning message.

The inventive method can advantageously be embodied in such a way that the warning message transmitted from the second vehicle is received and logged by a central control apparatus. This offers the advantage that in addition to a direct reaction in the form of the braking of the first vehicle, a temporally decoupled analysis and evaluation are enabled.

According to a further particularly preferred embodiment of the inventive method, warning messages received by the central control apparatus are evaluated with respect to their frequency and/or the circumstances of their occurrence. As a result of such evaluation, the possibility exists of analyzing the reasons for collision procedures occurring and if necessary performing an optimization of the control of the vehicles or other provisions to the effect that undesired collision procedures are in future reduced as far as possible or totally avoided or for example at least the collision speeds hereby occurring are reduced.

The inventive method can also advantageously be developed in such a way that in the case that the first vehicle and the second vehicle take the form of railborne vehicles, the warning message transmitted from the second vehicle is received and logged by a central control apparatus of a train control system. This is advantageous, as in particular in the case of railborne vehicles, the train control systems customarily employed have central control apparatuses which are suitable for the reception and logging of the warning messages.

According to a further particularly preferred embodiment the method proceeds within the framework of the automatic parking of the first vehicle, in particular in a depot or on a sidetrack. As previously explained, the inventive method is particularly advantageous in such situations in which the second vehicle is close to the approach procedure. In addition in particular in the case of automatic parking procedures, especially of rail vehicles, the need exists to bring two vehicles into the closest possible proximity, for the purpose of making best use of the available space. Accordingly, the inventive method can in particular be advantageously employed in conjunction with corresponding automatic parking procedures.

Alternatively or in addition to the previously cited preferred embodiment, the inventive method can advantageously also be developed in such a way that it proceeds within the framework of an automatic coupling procedure, wherein the warning message transmitted from the second vehicle is used on the part of the first vehicle as a criterion for the detection of an automatic coupling procedure. This embodiment of the inventive method has the advantage that with the warning message, the first vehicle receives a criterion to the effect that coupling of the first vehicle with the second vehicle has taken place. The warning message can here on the one hand be used as an additional criterion. This thus relates to the case that on the part of the first vehicle too, at least one corresponding criterion, possibly based on coupling contacts, is available. On the other hand the warning message transmitted from the second vehicle can also be used on the part of the first vehicle as a sole criterion for detection of an automatic coupling procedure in the event that no coupling contacts are provided, or for example an associated malfunction of the first vehicle exists.

Fundamentally, vehicles operated within the framework of the inventive method may take the form of vehicles of any kind.

The inventive method is preferably characterized in that vehicles are operated in the form of driverless vehicles. The term “driverless” should be understood to mean that at least at the time at which the method ensues, the vehicle has no driver. This also includes the case in which vehicles are operated in normal service with a driver and for example only parking and/or coupling procedures take place without a driver. Independently of this, the inventive method is particularly advantageous in the case of driverless vehicles, as for vehicles operated in a driverless manner, an approach of two vehicles to within short distances of each other is technically difficult, so that collision procedures can only be avoided with a high degree of reliability with additional technical effort.

The present invention further relates to a device for a vehicle, in particular a railborne vehicle.

As regards the device, the present invention is based on the task of specifying a device for a vehicle, in particular a railborne vehicle, which permits the approach of two vehicles to within short distances of each other, and can be realized with comparatively little outlay.

According to the invention this problem is solved by means of a device for a vehicle, in particular a railborne vehicle, with a detection apparatus for detecting the collision of another vehicle with the vehicle, a transmission apparatus for the transmission of a warning message triggered by the detection of the collision and for the reception of a warning message from a further vehicle in the event that the vehicle itself has traveled up to the further vehicle, and with a control apparatus for initiating a braking procedure in the event of the reception of the warning message from the further vehicle.

Thus in relation to the inventive method, the inventive device can be used both in the first vehicle and in the second vehicle. The inventive device thus has a detection apparatus to detect the collision of another vehicle with the vehicle and a transmission apparatus for the transmission of a warning message triggered by the is detection of the collision. At the same time the transmission apparatus is also embodied for the reception of a warning message from a further vehicle in the event that the vehicle itself has traveled up to the further vehicle. The control apparatus is here embodied to initiate a braking procedure in the event of the reception of the warning message from the further vehicle.

The advantages of the inventive device essentially correspond to those of the inventive method, so that in this respect reference is made to the corresponding present embodiments. The same applies with regard to the preferred developments of the inventive device cited below, so that in this respect too, reference is made to the explanations in connection with the respective corresponding preferred development of the inventive method.

The inventive device can preferably be designed in such a way that the detection apparatus is embodied to detect the collision of the other vehicle with the vehicle in the case that the vehicle is stationary, based on standstill monitoring of the stationary vehicle.

According to a further particularly preferred embodiment of the inventive device, the transmission apparatus is embodied to receive the warning message transmitted from the further vehicle directly from the further vehicle.

The inventive device can also preferably be developed in such a way that the transmission apparatus is embodied to receive the warning message transmitted from the further vehicle with the interpositioning of trackside equipment.

According to a further particularly preferred embodiment of the inventive device, the transmission apparatus embodiment is embodied to transmit the warning message to the trackside equipment, triggered by the detection of the collision of the other vehicle, for the purpose of transmission of the warning message to the other vehicle.

BRIEF DESCRIPTION OF THE SINDLE VEIW OF THE DRAWING

The invention is explained in greater detail below on the basis of exemplary embodiments. To the end the Figure shows, in a schematic diagram for explanation of an exemplary embodiment of the inventive method, two vehicles with an exemplary embodiment of the inventive device.

DESCRIPTION OF THE INVENTION

In the figure a first vehicle 10 and a second vehicle 20 may be discerned. Within the framework of the described exemplary embodiment, it should here be assumed that vehicles 10, 20 are railborne vehicles in the form of track-mounted vehicles. Accordingly, the vehicles 10, 20 travel on a rail or a track 30.

In the situation represented in the figure it is assumed that the vehicle 20 concerns a vehicle parked in a depot or on a sidetrack. The first vehicle 10 now approaches this second vehicle 20 in the direction of travel indicated with an arrow 40, that is to say traveling from left to right. It is here assumed that the first vehicle 10 is to be left or parked as close as possible to the second vehicle 20.

For the avoidance of misunderstanding, it should here be pointed out that, notwithstanding the representation in the figure, the first vehicle 10 and the second vehicle 20 will as a rule comprise more than one unit, that is to say for example a multiplicity of cars.

In the situation represented in the figure the problem now arises that the distance between the first vehicle 10 and the second vehicle 20 is so small, that a precise and reliable positioning on the part of the approaching first vehicle 10 such that a continued approach of the first vehicle 10 to the second vehicle 20 takes place without the danger of its colliding with the latter as a consequence thereof, cannot be reliably guaranteed, or at least not in all situations.

However in order not to have to forego a continued approach of the first vehicle 10 to the second vehicle 20 in this situation, the vehicles 10, 20 are embodied in such a way that the collision of the first vehicle 10 with the second vehicle 20 can be detected. To this end the two vehicles 10, 20 in each case have a control apparatus 11 or 21 respectively, a detection apparatus 12 or 22 respectively and a transmission apparatus 13 or 23 respectively, indicated in the form of an antenna. Corresponding to the representation in the figure the control apparatus 11 is here connected using communications technology to the detection apparatus 12 and the transmission apparatus 13 via communication links 14 or 15 respectively. The same applies in relation to the control apparatus 21 of the second vehicle 20, which is connected to the detection apparatus 22 and the transmission apparatus 23 via communication links 24 and 25.

The arrangement represented in the figure can now be operated in such a way that the collision of the first vehicle 10 with the second vehicle 20 is detected on the part of the second vehicle 20 by means of the detection apparatus 22. This takes place advantageously based on a standstill monitor, as a movement of the second vehicle 20 from rest can as a rule be more reliably detected than a change in speed or acceleration of the first vehicle 10 caused by a collision procedure. The detection apparatus 22 can thus for example be embodied as a distance pulse generator or comprise such a distance pulse generator as a component.

A warning message transmitted on the part of the control apparatus 21 by means of the transmission apparatus 23, triggered by the detection of the collision by the detection apparatus 22. Within the framework of the described exemplary embodiment, it should here be assumed that the transmission of the warning message takes place using radio as a basis.

Consequently, on the one hand the possibility now exists that the warning message transmitted from the second vehicle 20 is received directly by the first vehicle 10 by means of the transmission apparatus 13. This offers the advantage that a direct transmission of the warning message from the second vehicle 20 to the first vehicle 10 as a rule permits that fastest possible transmission of the warning message.

As an alternative to this it is however also possible that the warning message transmitted from the second vehicle 20 is received by the first vehicle 10 using the interpositioning of a trackside equipment unit 60. According to the representation in the figure, the trackside equipment unit 60 is linked using communications technology on the one hand to a trackside transmission apparatus 50, which can take the form of a WLAN access point for example, and on the other hand to a central control apparatus 70. It should be pointed out here that the trackside transmission apparatus 50 and the trackside equipment unit 60 could of course also be embodied as a shared component.

Insofar as the warning message from the second vehicle 20 is now received via the transmission apparatus 23 and the trackside transmission apparatus 50 of the trackside equipment unit 60, this warning message can be transmitted or forwarded to the first vehicle 10 from the trackside equipment unit 60 via the trackside transmission apparatus 50 and the transmission apparatus 13. This offers the advantage that corresponding communication channels for data transmission between the vehicles 10, 20 and trackside equipment unit 60 are as a rule anyway already present in automatic train control system. This applies in particular in the case that the automatic train control system is embodied as a CBTC system.

Regardless of whether the warning message transmitted from the second vehicle 20 is received directly or indirectly by the first vehicle 10, a braking procedure initiated on the part of the first vehicle 10 or its control apparatus 11 as a consequence of the warning message transmitted from the second vehicle 20. This thus offers the advantage that the collision involving the two vehicles 10, 20, which is undesirable within the context of the parking procedure, is accordingly warded off as rapidly as possible, in that the first railborne vehicle 10 is braked.

In addition, the possibility advantageously exists that the warning message transmitted from the second vehicle 20 is received and logged—directly or indirectly—by the central control apparatus 70 via the trackside transmission apparatus 50 and the trackside equipment unit 60. It is hereby made possible for warning messages received from the central control apparatus 70 to be analyzed with respect to their frequency and/or the circumstances of their occurrence. The creates the conditions for future optimization of the parking of the railborne vehicles 10, 20 such that undesired collision procedures are if possible prevented or at least reduced in frequency and/or force.

As an alternative to the first vehicle 10 approaching the second vehicle 20 within the framework of an automatic parking procedure of the first vehicle 10, the situation in the figure could also obtain, for example, that the corresponding approach takes place within the framework of an automatic coupling procedure. In this case, a (slow) collision of the first vehicle 10 with the second vehicle 20 is thus fundamentally desired. In this situation, the warning message transmitted from the second vehicle 20 can on the one hand be used on the part of the first vehicle 10 to brake the first vehicle 10. At the same time the warning message on the part of the first vehicle 10 or its control apparatus 11 can also continue to be employed as a criterion for detection of an automatic coupling procedure. Depending on the respective circumstances the warning message can here serve as an exclusive or additional criterion for the detection of the coupling procedure.

Independently of the respective operational situation in which the previously described method is employed, it is particularly suitable for the operation of driverless vehicles. Even if an application is here favorable in particular in connection with railborne vehicles, possibly in the form of rail vehicles, the track-bound nature of the vehicles 10, 20 is not fundamentally a precondition for execution of the method. The possibility thus also exists that, notwithstanding the representation in the figure, the vehicles 10, 20 take the form of autonomous, non-railborne vehicles.

Independently of the type of the vehicles 10, 20 and the respective operational situation, the inventive method and the inventive device corresponding to the embodiments in connection with the previously described exemplary embodiments in particular have the advantage that they enable or support the approach of two vehicles to within short distances of each other, and can be realized with comparatively little outlay.

The invention claimed is:

1. A method for operating railborne or non-railborne vehicles, the method comprising the following steps:

using a second vehicle to detect a collision of a first vehicle with the second vehicle based on standstill monitoring when the second vehicle is stationary;

transmitting a warning message from the second vehicle triggered by the detection of the collision of the first vehicle with the second vehicle; and initiating a braking procedure by the first vehicle due to the warning message transmitted from the second vehicle.

2. The method according to claim 1, which further comprises transmitting the warning message directly from the second vehicle to the first vehicle.

3. The method according to claim 1, which further comprises transmitting the warning message from the second vehicle through a trackside equipment unit to the first vehicle.

4. The method according to claim 1, which further comprises using a central controller to receive and log the warning message transmitted by the second vehicle.

5. The method according to claim 4, which further comprises analyzing warning messages received from the central controller with respect to at least one of frequency or circumstances of occurrence of the warning messages.

6. The method according to claim 4, which further comprises providing railborne vehicles as the first and second vehicles, and providing the central controller as a central controller of a train control system for receiving and logging the warning message transmitted from the second vehicle.

7. The method according to claim 1, which further comprises carrying out the method for operating vehicles within a framework of an automatic parking of the first vehicle.

8. The method according to claim 7, which further comprises carrying out the automatic parking of the first vehicle in a depot or on a sidetrack.

9. The method according to claim 1, which further comprises carrying out the method for operating vehicles within a framework of an automatic coupling procedure, and using the warning message transmitted from the second vehicle by the first vehicle as a criterion for detection of the automatic coupling procedure.

10. The method according to claim 1, which further comprises providing the vehicles as driverless vehicles.

11. The method according to claim 1, which further comprises providing the vehicles as rail vehicles, and activating the standstill monitoring as part of the second vehicle when the second vehicle is parked.

12. A device for a railborne or non-railborne vehicle, the device comprising:

a detector for detection of a collision of a further vehicle with the vehicle based on standstill monitoring of the vehicle when stationary;

a transmitter:

for transmitting a warning message triggered by the detection of the collision of the further vehicle with the vehicle, and for receiving a warning message from the vehicle when the further vehicle has traveled up to the vehicle; and a controller for initiating a braking procedure upon receiving the warning message from the vehicle.

13. The device according to claim 12, wherein said transmitter is configured to receive the warning message transmitted directly from the vehicle.

14. The device according to claim 12, wherein said transmitter is configured to receive the warning message transmitted from the vehicle through a trackside equipment unit.

15. The device according to claim 14, wherein said transmitter is configured to transmit the warning message, triggered by the detection of the collision of the further vehicle, to said trackside equipment unit for transmitting the warning message to the further vehicle.

16. The device according to claim 12, wherein the vehicles are rail vehicles, and said standstill monitoring is part of the vehicle and is activated when the vehicle is parked.

* * * * *